Patented May 2, 1950

2,506,249

UNITED STATES PATENT OFFICE 2,506,249

PROCESS FOR MANUFACTURING ARTIFICIAL CHAMOIS

Philip Th. Tammen, Breda, Netherlands, assignor, by mesne assignments, to American Enka Corporation, Enka, N. C., a corporation of Delaware No Drawing. Application April 23, 1947, Serial No. 743,471. In the Netherlands April 2, 1943

Section 1, Public Law 690, August 8, 1946
Patent expires April 2, 1963

7 Claims. (Cl. 117—98)

My invention relates to a process for manufacturing artificial chamois and to the products obtained by that process.

It is an object of my invention to produce from viscose (being the alkaline solution of alkali-cellulose-xanthogenate of the rayon industry) artificial chamois having properties and an appearance resembling surprisingly closely those of natural chamois.

Another object of my invention is the production from viscose of artificial wash-leather having excellent water absorbing properties and strength.

Still other objects of my invention will be clear from the following description and examples.

I have found that it is possible to manufacture from viscose an excellent substitute for chamois resembling surprisingly chamois as to its water absorbing properties and its appearance by incorporating in the viscose one or more substances decreasing the surface tension and one or more substances which develop gas or vapor at least at the temperature of the coagulation and which are not or only to a very small extent soluble in and chemically indifferent to the viscose, whereupon the mass is formed in sheets. I have further found that a particularly strong product can be obtained by incorporating an armouring of textile material in the mass or by applying the mass on a layer of such material. I prefer to use a fabric having wide meshes which previously has been coated with viscose. The mixture of viscose and the additions according to my invention is then spread over that supporting layer.

Substances decreasing the surface tension which are particularly suitable for use according to my invention, are soaps, such as potassium oleate, sodium palmitate, etc., further saponin and sulfonation products of oils and alcohols. Very good substances for the development of vapor under the circumstances of my method are readily volatile hydrocarbons, halogenated hydrocarbons and ethers. As substances for the development of gas in the present alkaline masses ammonium salts are particularly suitable; for acid masses ammonium carbonate and other carbonates and bicarbonates may be used.

For the manufacture of artificial sheets of wash-leather according to my invention petroleum ether having a boiling point of 38–42° C., is preferably used but also very good results can be obtained with dichloromethane and monobromoethane. According to my invention I can also obtain very good results by using ammonium carbonate which develops gaseous ammonia with the alkali of the viscose at elevated temperature.

By a right selection of the nature and the amount of the additions I can manufacture artificial chamois having very fine pores at ordinary temperature and under ordinary pressure. By regulation of the amount and the nature of the substance decreasing the surface tension it is possible to control the number and thereby the fineness of the pores; the total pore volume can be controlled by the amount and nature of the substance developing vapor or gas. Addition of a larger amount of the substance decreasing the surface tension gives a product having finer pores and addition of a larger amount of the substance developing vapor or gas increases the proportion of the total pore volume to the volume of the mass skeleton, therefore the relative pore volume. Obviously it is also possible to influence the manner and the velocity of evaporation and gas formation by controlling the temperature and/or the pressure.

By addition of pigments, dyes, fillers, plasticizers and the like known means it is possible to obtain desired properties and a desired appearance of the final product. In order to obtain very fine pores and a very strong product it is desirable to use a mass having as high a viscosity as possible. In practice this viscosity is only limited by the fact that it may not be so high that the mass is not easily workable.

Only in order to elucidate further my invention, but not to limit my invention to the data specified therein, two examples relating to the manufacture of sheets of wash-leather are given.

Example I 100 g. of viscose (9% of cellulose, 5% of sodium hydroxide, Hottenroth number: about 10) are mixed with 2 cm.$^3$ of a 10% solution of potassium oleate and 1 g. iron ochre. Thereupon 1.5 cm.$^3$ of petroleum ether (boiling range 38–42° C.) are kneaded well through the mass; finally still another amount of 1.5 cm.$^3$ of the same petroleum ether are mixed well with the mass.

A thin layer of the above mentioned viscose without additions is spread over a sheet of vitrage followed by a short heating to about 50° C. Thereby the viscose gelatinizes, whereupon the above mentioned mixture of viscose, potassium oleate and petroleum ether is applied at both sides of the vitrage as a coating of about 1 mm. thick. The sheet obtained is heated to about 50° C. under ordinary pressure. After forming sufficiently fine pores in the coating mass the product is coagulated in an acid bisulfate bath and desulfurized.

Example II

In order to increase the viscosity and to accelerate the gelatinizing 100 g. of viscose (8% cellulose, 6.5% sodium hydroxide, Hottenroth number: about 20) is mixed with 5 g. of ammonium carbonate. Thereupon 3 g. Turkey red oil and 5 g. of dichloromethane are stirred through the mass and finally the mass is spread over glass plates. The plates are heated in a moderate vacuo at about 30° C. After sufficient development of vapor and gelatinizing the viscose layer is treated with an acid bisulfate bath and desulfurized.

While I have described several manners in which my invention may be carried out, and pointed out two particular examples of my method, it is to be understood that these are to be taken as illustrative or exemplary rather than restrictive and that various changes in the compositions, additions, temperatures, etc. specified may be made as will be understood by those skilled in the art without departing from the spirit of the invention or the scope of the following claims.

I claim:

1. A process for manufacturing artificial chamois which comprises incorporating in a viscose solution at least one surface tension reducing agent of the class consisting of soaps, sulphonated oils, sulphonated alcohols and saponin and at least one substance of the class consisting of low boiling hydrocarbons and halogenated hydrocarbons that generates a vapor at least at the temperature at which the viscose is coagulated and is substantially insoluble and chemically inert in the viscose, forming sheets of the viscose mass and coagulating the sheets.

2. A process as defined in claim 1 in which the vapor generating substance is petroleum ether having a boiling range of 38° C.–42° C.

3. A process as defined in claim 1 in which the vapor generating substance is a halogenated hydrocarbon.

4. A process as defined in claim 1 in which the vapor generating substance is dichloromethane.

5. A process as defined in claim 1 in which the surface tension reducing agent is potassium oleate and the vapor generating substance is petroleum ether.

6. A process as defined in claim 1 in which the surface tension reducing agent is Turkey red oil and the vapor generating substance is dichloromethane.

7. A process for manufacturing artificial chamois which comprises coating an open mesh fabric with a viscose solution and gelatinizing the same by heating in the neighborhood of 50° C., incorporating in a similar viscose solution a surface tension reducing agent of the class consisting of soaps, sulphonated oils, sulphonated alcohols and saponin and a vapor generating substance of the class consisting of low boiling hydrocarbons and halogenated hydrocarbons that generates a vapor at least at the temperature at which the viscose is coagulated, applying the viscose mixture to both sides of the gelatinized viscose fabric sheet and heating the laminated sheet in the neighborhood of 50° C. under atmospheric pressure whereby fine pores are formed in the outside layers of the sheet and finally regenerating the sheet in an acid bisulphate bath and desulphurizing.

PHILIP TH. TAMMEN.

REFERENCES CITED

The following references are of record in the file of this patent:

UNITED STATES PATENTS

| Number | Name | Date |
|---|---|---|
| 1,552,422 | Dasher | Sept. 8, 1925 |
| 1,770,310 | Karplus | July 8, 1930 |
| 1,829,905 | Lilienfeld | Nov. 3, 1931 |
| 2,138,712 | Saffert | Nov. 29, 1938 |
| 2,165,392 | Lilienfeld | July 11, 1939 |
| 2,242,372 | Schneider | May 20, 1941 |